N. & S. VAN DYK.
Coffee Roaster.
No. 33,113.
Patented Aug. 20, 1861.
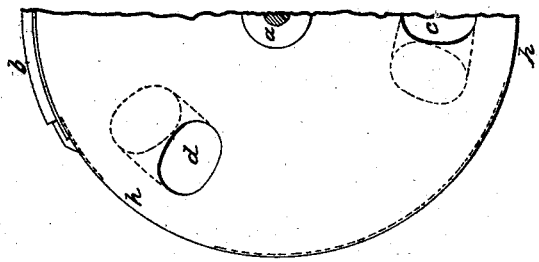
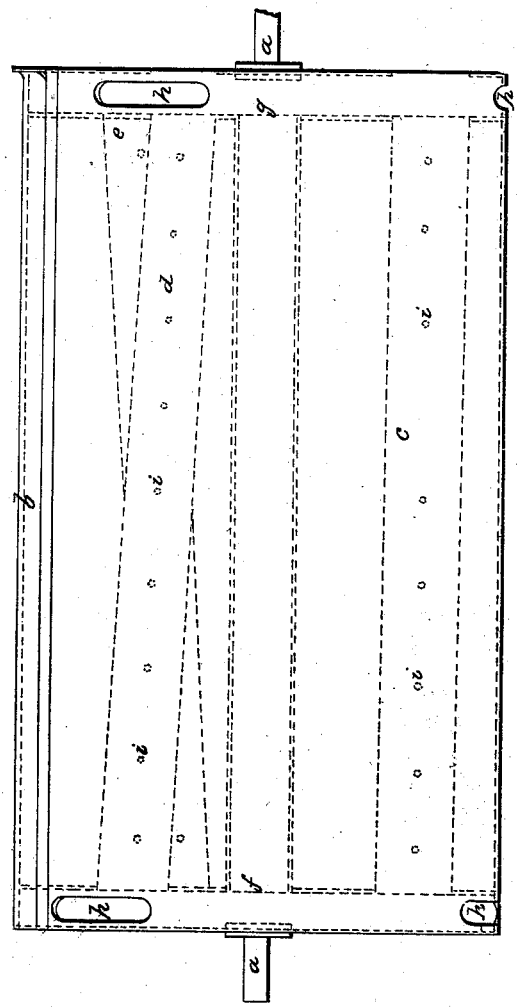
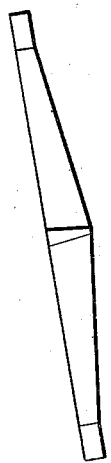

UNITED STATES PATENT OFFICE.

NICHOLAS VAN DYK AND SOLOMON VAN DYK, OF ST. LOUIS, MISSOURI.

COFFEE-ROASTER.

Specification of Letters Patent No. 33,113, dated August 20, 1861.

*To all whom it may concern:*

Be it known that we, NICHOLAS VAN DYK and SOLOMON VAN DYK, of St. Louis, in the county of St. Louis and State of Missouri, have invented a new and useful Improvement in Coffee-Roasters; and we do hereby declare that the following is a full, clear, and exact description of the same, reference being had to the annexed drawing, making a part of this specification, and to the letters of reference marked thereon.

The object of this invention is to extend the heating surface of the ordinary cylindrical coffee roaster, and to cause the coffee to be shifted backward and forward from end to end as it is rotated; and it consists in making the cylinder with double heads, between which the heat from the fire is admitted, and in connecting them by oval flues that are placed in an angular position with reference to the center of the cylinder and to each other, in such a manner that as the cylinder revolves the coffee is first passed by the angular action of one of the flues toward one end of the cylinder, and is afterward shifted by another flue toward the other end of the cylinder.

To enable others skilled in the art to make and use our invention, we will proceed to describe its construction and operation.

Figure 1 is a side elevation of our improved coffee roaster, placed over a fire as is indicated by the grate bar represented on the drawing; and Fig. 2 is part of an end elevation of the same.

The cylinder is hung on a shaft $a$, along which it may be shifted when it is desired to remove it from the fire, as is ordinarily practiced; and it is furnished with a sliding door $b$, by which the coffee may be placed in the cylinder and withdrawn when necessary. One of the external heads of the cylinder has three holes $c$, $d$, $e$, corresponding with the three oval flues that connect the internal heads $f$ and $g$. The flues are not placed parallel with the center of the cylinder, but are placed angularly to it and with each other, so that when the cylinder is revolved the coffee within it is shifted alternately toward either end. Between the double heads at each end of the cylinder are openings $h$, for the admission of the heat from the fire. The flues are pierced with minute holes $i$ for the escape of steam and dust. The shaft passes through a tube constructed in the cylinder.

When this machine is in operation, the heat of the fire circulates below the whole length of the cylinder and through the openings $h$, between the heads, and through the oval flues; and when it is being revolved, the angular action of the flues upon the coffee with which the roaster is partially filled, keeps the coffee constantly shifting from end to end. The tube through which the shaft $a$ passes, prevents the coffee acquiring any dirt from the shaft; and the holes in the flues permit the passage of the steam and dust from the coffee that is being roasted.

In the ordinary cylindrical roaster the coffee is merely shifted from side to side by the rotation, and may be burned at one end of the cylinder while the other end is insufficiently hot; but in our improved machine the coffee is shifted both sidewise and endwise, and the operation is much more certainly and uniformly conducted. And there is also a great saving of time, and improvement in the flavor of the coffee effected. For as there is an increase in the extent of the heating surface, and there is not so much risk of burning the coffee where it is shifted constantly in every direction, a hotter fire may be employed than could be used without the angular flues, and the coffee consequently may be more quickly roasted and without the loss of its aromatic flavor incident to a long continued exposure to the heat.

We claim as our invention, and desire to secure by Letters Patent:

The construction of a cylindrical coffee roaster with internal flues placed angularly to the center of the cylinder and with each other, substantially in the manner described and for the purpose specified.

NICHOLAS VAN DYK.
SOLOMON VAN DYK.

Witnesses:
ROLLIN B. GRAY,
JAMES JOHNSTONE.